United States Patent
Li et al.

(10) Patent No.: US 9,319,853 B2
(45) Date of Patent: Apr. 19, 2016

(54) PACKET SWITCHED COMMUNICATION PRECEDENCE AT A MULTI-MODE COMMUNICATION DEVICE

(75) Inventors: Yan Li, Beijing (CN); Lu Gao, Beijing (CN); Wentao Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 13/812,136

(22) PCT Filed: Aug. 27, 2010

(86) PCT No.: PCT/CN2010/076416
§ 371 (c)(1),
(2), (4) Date: Jan. 24, 2013

(87) PCT Pub. No.: WO2012/024844
PCT Pub. Date: Mar. 1, 2012

(65) Prior Publication Data
US 2013/0142088 A1    Jun. 6, 2013

(51) Int. Cl.
| H04L 12/16 | (2006.01) |
| H04W 4/12 | (2009.01) |
| H04W 88/06 | (2009.01) |

(52) U.S. Cl.
CPC .............. *H04W 4/12* (2013.01); *H04W 88/06* (2013.01)

(58) Field of Classification Search
CPC ..... H04W 76/02; H04W 48/18; H04W 88/06; H04W 60/00; H04W 68/00; H04M 3/42042; H04M 3/436
See application file for complete search history.

(56) References Cited

U.S. PATENT DOCUMENTS

| 7,983,242 B2 | 7/2011 | Nasielski et al. |
| 2005/0041640 A1* | 2/2005 | Nasielski et al. ............ 370/352 |
| 2006/0165033 A1* | 7/2006 | Vaittinen et al. ............ 370/328 |
| 2010/0195643 A1 | 8/2010 | Kodali et al. |
| 2010/0208624 A1 | 8/2010 | Vikberg |
| 2010/0272250 A1* | 10/2010 | Yap et al. ................ 379/212.01 |

FOREIGN PATENT DOCUMENTS

| CN | 101040558 A | 9/2007 |
| CN | 101433072 A | 5/2009 |
| CN | 101690358 A | 3/2010 |

(Continued)

OTHER PUBLICATIONS

International Search Report and Written Opinion—PCT/CN2010/076416—ISA/EPO—Jun. 9, 2011.

*Primary Examiner* — Chi H Pham
*Assistant Examiner* — Raul Rivas
(74) *Attorney, Agent, or Firm* — S. Hossain Beladi; Satheesh K. Karra

(57) ABSTRACT

A circuit switched (CS) paging message is received at a multi-mode communication device. The CS paging message is received when a packet switched (PS) service is active at the multi-mode communication device. A PS precedence feature is activated at the multi-mode communication device that prioritizes PS communications over CS communications. A CS bearer connection is established with a CS network in response to receiving the CS paging message, and an incoming call notification message that identifies a calling party is received from the CS network. Upon receipt of the incoming call notification message, the CS bearer connection with the CS network is released. A notification of a missed incoming call from the calling party is displayed (e.g., substantially in real-time) via a user interface.

23 Claims, 7 Drawing Sheets

(56) References Cited

FOREIGN PATENT DOCUMENTS

| JP | H11177713 | A | 7/1999 |
|---|---|---|---|
| JP | H11225165 | A | 8/1999 |
| JP | 2000349924 | A | 12/2000 |
| JP | 2007019999 | A | 1/2007 |
| WO | 2005020620 | | 3/2005 |
| WO | 2006040515 | A1 | 4/2006 |

* cited by examiner

PACKET SWITCHED COMMUNICATION PRECEDENCE AT A MULTI-MODE COMMUNICATION DEVICE

I. FIELD

The present disclosure is generally related to processing of packet switched communications at a multi-mode communication device.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

A dual-mode mobile telephone is capable of communicating with a packet switched network and a circuit switched network. The dual-mode mobile telephone may suspend communications associated with one mode while the other mode is in an active connection mode. In this case, a user may miss incoming calls, without any notification to the user, when the packet switched mode is active. Further, in this case, a calling party may receive a notification that the called party is out of service.

Some dual-mode mobile telephones may have the processing capability to provide a circuit (i.e., voice) precedence over packet (CPOP) service. A typical CPOP service may result in disruption of an active packet switched service in the event of an incoming call. In a typical CPOP system, a user may decide to reject the incoming call (e.g., by pressing a hang-up key of a handset). However, the associated delay to the packet switched service (typically ten seconds or more) may result in network tear down of a packet switched network connection associated with the packet switched service. As a result, a poor user experience may result, such as when the user is engaged in a high priority packet switched service when an incoming call is received.

III. SUMMARY

The present disclosure describes a packet switched (PS) precedence feature that prioritizes PS communications (e.g., data communications) over circuit switched (CS) communications (e.g., voice communications) at a multi-mode communication device. For example, a packet precedence over voice (PPOV) feature may prevent disruption of an active PS service when an incoming voice call is received. Further, the PPOV feature of the present disclosure allows a user to be notified of a missed incoming voice call in substantially real-time in order to return the call.

In a particular embodiment, a method includes receiving a circuit switched (CS) paging message at a multi-mode communication device. The CS paging message is received when a packet switched (PS) service is active at the multi-mode communication device. A PS precedence feature at the multi-mode communication device prioritizes PS communications over CS communications. For example, the PS precedence feature may be a packet precedence over voice (PPOV) feature that prioritizes packet switched communications over voice communications. The method includes establishing a CS bearer connection with a CS network in response to receiving the CS paging message. An incoming call notification message that identifies a calling party is received from the CS network at the multi-mode communication device. Upon receipt of the incoming call notification message, the CS bearer connection with the CS network is released. The method further includes displaying a notification of a missed incoming call from the calling party (e.g., a display notice rendered substantially in real-time) via a user interface of the multi-mode communication device.

In another particular embodiment, an apparatus includes a first antenna, a second antenna, a display device, and call processing logic. The first antenna is used to communicate with a PS network, and the second antenna is used to communicate with a CS network. The call processing logic is operable to activate a PPOV feature that prioritizes packetized data communications with the PS network over voice communications with the CS network. A CS paging message is received via the second antenna while an active PS service utilizes the first antenna to communicate with the PS network. When the PPOV feature is activated, the call processing logic establishes a CS bearer connection with the CS network via the second antenna in response to receiving the CS paging message. An incoming call notification message that identifies a calling party is received from the CS network via the second antenna. Upon receipt of the incoming call notification message, the call processing logic releases the CS bearer connection with the CS network and displays a notification of a missed incoming call from the calling party. For example, the notification may include a calling party number, a name of the calling party, an image associated with the calling party, or any combination thereof. The notification may be displayed at the display device via a user interface. A calling party may receive an indication that the called party is busy rather than an indication that the called party is out of service.

In another particular embodiment, an apparatus includes means for activating a PPOV feature that prioritizes packetized data communications with a PS network over voice communications with a CS network. The apparatus further includes means for receiving a CS paging message when a PS service is active and means for establishing a CS bearer connection with the CS network in response to receiving the CS paging message. The apparatus includes means for receiving an incoming call notification message from the CS network that identifies a calling party and means for releasing the CS bearer connection with the CS network upon receipt of the incoming call notification message. The apparatus further includes means for displaying a notification of a missed incoming call from the calling party via a user interface.

One particular advantage provided by at least one of the disclosed embodiments is the ability to avoid disrupting a high priority packet switched service that may be sensitive to delay (e.g., a video telephony application) in order to receive an incoming call. Further, by receiving information that identifies a calling party and notifying a user in substantially real-time, the user is aware of the missed call and is provided the ability to return the call. In one embodiment, an identity of the calling party may be a factor that is used to determine whether to disrupt the packet switched service. Thus, precedence of packet switched communications at a multi-mode communication device may depend on a priority of a particular packet switched service, an identity of a calling party, other factors, or a combination thereof.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

With the explosive increase in the number of smart phones, there has been an increase in packet switched communications. Some packet data services may be considered high priority and may be sensitive to delay, such as business and video telephony applications. In such cases, in order to sustain a data service that is considered crucial or important, a packet precedence over voice (PPOV) feature may be desirable. The PPOV feature may prevent interruption of one or more packet data services by a circuit switched service (e.g., a voice call). In this case, notifying the user of a missed voice call may also be desirable to allow the user to return the missed call. Further, since paging success rate is a key performance indicator for network performance, it may be desirable for an operator to successfully deliver a page associated with the voice call. In addition, when a multi-mode communication device has the PPOV feature activated, a calling party may receive a busy indication from the operator rather than an out of service indication.

Current call processing technology may be able to provide voice precedence over PS (i.e., "CPOP" or "VPOP") or concurrent service. Such call processing technology may include technology related to or defined by Global System for Mobile Communications (GSM), Code division multiple access (CDMA, CDMA 2000 1x), Evolution-Data Optimized (EVDO), Wideband Code Division Multiple Access (WCDMA), Long Term Evolution (LTE), and LTE-A. For example, conventional hybrid 1x/DO operations do not provide PPOV with missed voice call notification. Further, conventional handsets do not provide the feature of PPOV with real time user interface notification of missed voice calls.

Further, some devices cannot support concurrent voice and data due to a single active transmission (Tx) capability or due to in-device mutual interference. One such device is a 1x/DO hybrid terminal dual mode dual standby with single active Tx chain. Another example is a GSM900/EVDO dual mode phone that utilizes a telecommunications network and a mobile network. The PPOV feature of the present disclosure can be a useful capability for such phones in order to protect high priority packet services. The PPOV feature of the present disclosure may also address the in-device mutual interference problem for some concurrent dual mode phones by eliminating the need for simultaneous transmissions associated with two different technologies.

Figure 1:
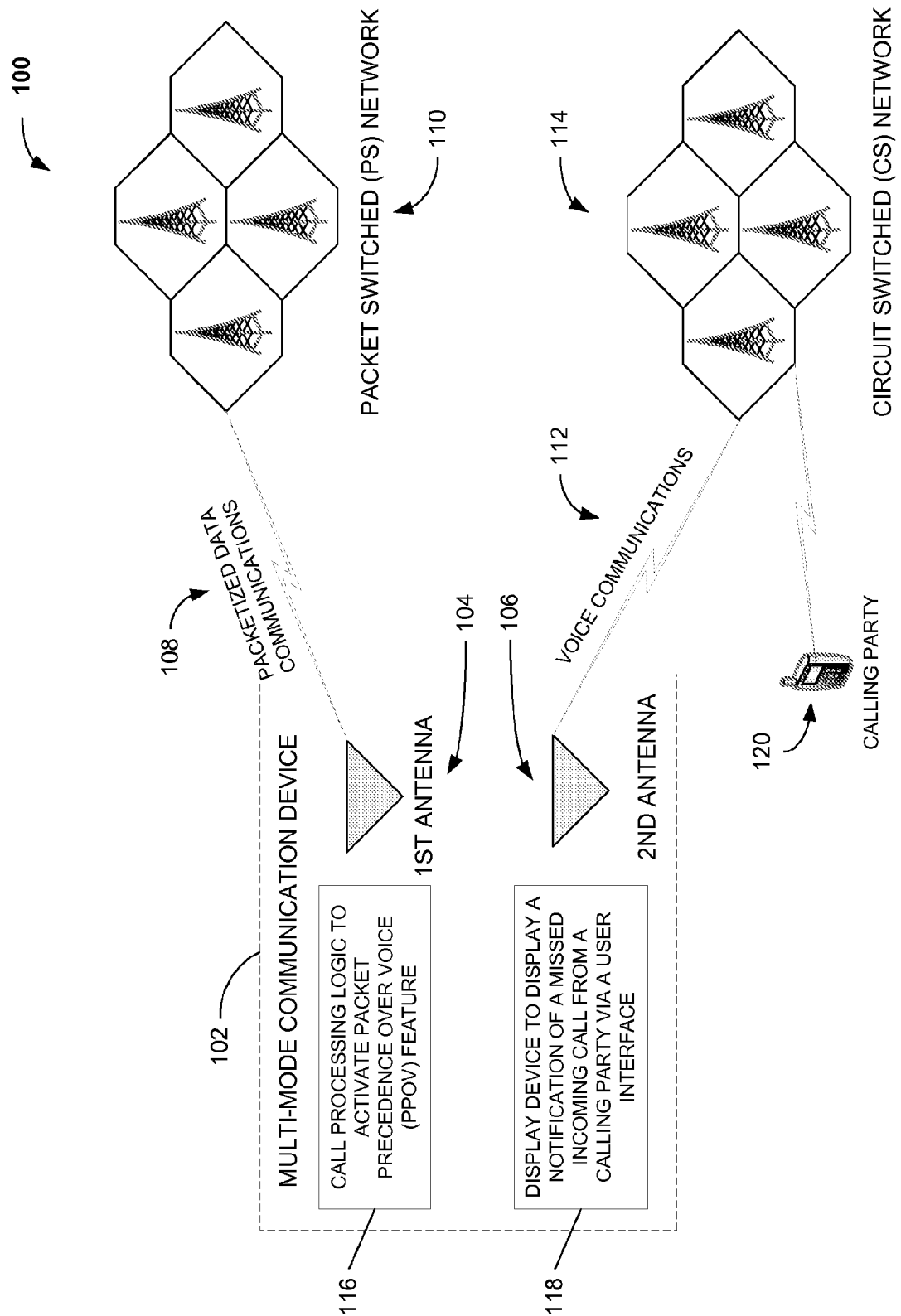
FIG. 1 is a block diagram of a particular illustrative embodiment of a system including call processing logic to activate a packet precedence feature.

Referring to FIG. 1, a particular illustrative embodiment of a system including call processing logic to activate a packet precedence feature is disclosed and generally designated 100. The packet precedence feature (e.g., a PPOV feature) may provide a user of a multi-mode communication device 102 with the ability to avoid disrupting a high priority packet switched service that may be sensitive to delay (e.g., a video telephony application) in order to receive an incoming call.

The multi-mode communication device 102 includes at least a first antenna 104 and a second antenna 106. Alternatively, any number of antennas may be included. Packetized data communications 108 between the multi-mode communication device 102 and a packet switched (PS) network 110 may utilize the first antenna 104. Circuit switched (CS) communications (e.g., voice communications 112) between the multi-mode communication device 102 and a CS network 114 may utilize the second antenna 106. In one embodiment, a first mode of the multi-mode communication device 102 includes an EVDO mode that provides PS services via the first antenna 104, and a second mode of the multi-mode communication device 102 includes a GSM mode that provides CS services via the second antenna 106.

The multi-mode communication device 102 also includes call processing logic 116 and a display device 118. In a particular embodiment, the calling processing logic 116 includes processor executable instructions that are stored at a computer readable tangible medium. The call processing logic 116 is operable to activate a packet precedence over voice (PPOV) feature that prioritizes packetized data communications 108 with the PS network 110 over voice communications 112 with the CS network 114. The display device 118 is operable to display a notification of a missed incoming call from a calling party 120 via a user interface (not shown in FIG. 1, but see FIG. 3A-C).

In operation, the multi-mode communication device 102 receives a CS paging message (i.e., a page associated with an incoming voice call from the calling party 120) when a PS service is active at the multi-mode communication device 102. The PS service utilizes the first antenna 104 to communicate with the PS network 110. In one embodiment, the multi-mode communication device 102 is a GSM/EVDO dual-mode device, the PS network 110 is an EVDO network, and the CS network 114 is a GSM network. It should be noted that the GSM/EVDO dual-mode device is an illustrative example and is not to be considered restrictive. When the multi-mode communication device 102 is a GSM/EVDO dual mode device, the CS paging message is a GSM paging message. In this case, when the PS service is active, the dual-mode device is in an EVDO active mode and monitoring for a GSM page.

When the PPOV feature is not activated (e.g., the PS service is not associated with a particular application), the incoming call from the calling party 120 may be received. When the PPOV feature is activated, the multi-mode communication device 102 establishes a CS bearer connection with the CS network 114 that utilizes the second antenna 106. In one embodiment, the multi-mode communication device 102 is able to concurrently support both the PS service and a CS service. In this case, the PS service is not interrupted in order to establish the CS bearer connection with the CS network 114. Alternatively, the PS service may be suspended prior to establishing the CS bearer connection with the CS network 114 when the multi-mode communication device 102 is not able to concurrently support both the PS service and the CS service. When the CS network 114 is a GSM network, establishing the CS bearer connection involves a radio bearer setup between the multi-mode communication device 102 and the GSM network.

After establishing the CS bearer connection, the multi-mode communication device 102 receives an incoming call notification message from the CS network 114. The incoming call notification message identifies the calling party 120 (e.g., via a calling party number). Upon receipt of the incoming call notification message (e.g., upon receipt of the phone number of the calling party 120), the multi-mode communication device 102 releases the CS bearer connection with the CS network 114. In the event that the PS service is suspended prior to establishing the CS bearer connection with the CS network 114, the PS service is reactivated upon release of the CS bearer connection. As such, a delay associated with suspension of the PS service in order to detect the incoming call notification message may not result in termination of the PS service.

When the CS network 114 is a GSM network and the PS network 110 is an EVDO network, releasing the CS bearer connection involves releasing the GSM connection and returning to the EVDO active mode. The EVDO active mode is interrupted with a short delay in order to receive the incoming call notification message to allow the multi-mode communication device 102 to temporarily operate in the GSM active mode. As the calling party can be identified in the early stages of GSM radio bearer setup, the interruption of the EVDO active mode can be reduced to avoid termination of the PS data service.

Thus, the PPOV feature of the present disclosure may prevent disruption of the PS service that results from a typical circuit precedence over packet (CPOP) system. In a typical CPOP system, the user may decide to reject the incoming call (e.g., by pressing a hang-up key of a handset). However, the associated delay to the PS service (typically ten seconds or more) may result in network tear down of the PS connection. By contrast, with the PPOV feature of the present disclosure, the PS connection with the PS network 110 is not unconditionally broken in order to tune to the incoming voice call.

Further, the PPOV feature of the present disclosure utilizes existing signaling messages and call processing methods. In the present disclosure, the PPOV feature is implemented via call processing logic 116 stored at the multi-mode communication device 102. As such, the PPOV feature does not require changes at the network side (i.e., no changes at either the PS network 110 or at the CS network 114) and does not require coordination between the networks in order to deliver the incoming call notification message. Further, as noted above, the PPOV feature is not limited to the GSM/EVDO context. Rather, the PPOV feature can be applied to various technologies and associated combinations. For example, the PPOV feature may be utilized with CDMA2000 1x, WCDMA, GSM, 1x, GPRS, CDMA2000, TD-SCDMA, and LTE, among other possibilities.

Accordingly, the call processing logic 116 performs the function of activating a PPOV feature that prioritizes packetized data communications with a PS network over voice communications with the CS network 114. Further, the call processing logic 116 performs the function of receiving a CS paging message when a PS service is active and the function of establishing a CS bearer connection with the CS network 114 in response to receiving the CS paging message. In addition, the call processing logic 116 performs the function of receiving an incoming call notification message that identifies a calling party from the CS network 114. The call processing logic 116 performs the function of releasing the CS bearer connection with the CS network 114 upon receipt of the incoming call notification message.

In one embodiment, the call processing logic 116 performs the function of receiving a user activation request and the function of activating the PS service in response to the user activation request. In one embodiment, the call processing logic 116 performs the function of suspending the PS service prior to establishing the CS bearer connection with the CS network 114. In this case, the call processing logic 116 performs the function of reactivating the PS service upon release of the CS bearer connection.

The call processing logic 116 may include any collection of systems or sub-systems that individually or jointly execute a set, or multiple sets, of instructions to perform the functions described above. In one embodiment, the call processing logic 116 utilizes a processor that executes one or more sets of instructions (e.g., software) that reside entirely in memory (see FIG. 7) to perform the functions. Alternatively, the call processing logic 116 may perform the functions using application specific integrated circuits, programmable logic arrays, other hardware devices, or any combination thereof.

Figure 3A:
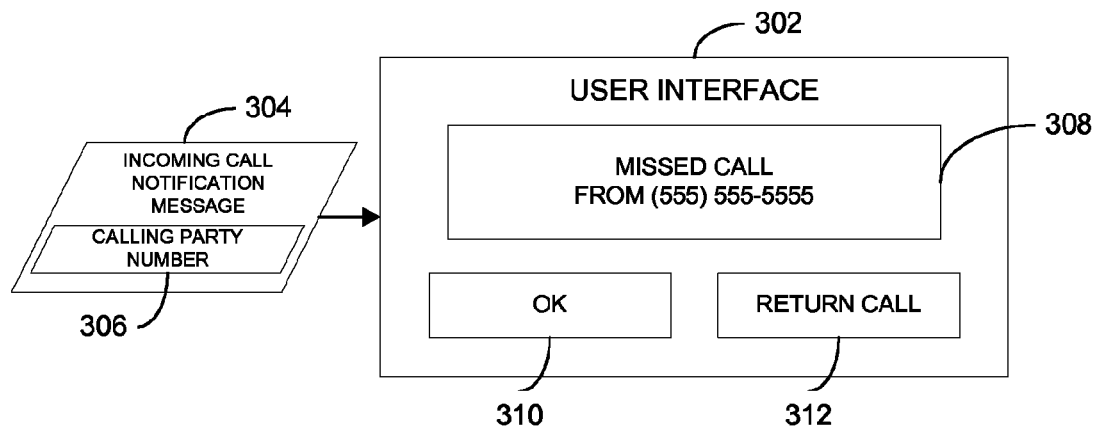
FIG. 3A is a diagram of a first illustrative embodiment of a user interface to display a notification of a missed incoming call from a calling party when a packet precedence feature is activated.
Figure 3B:
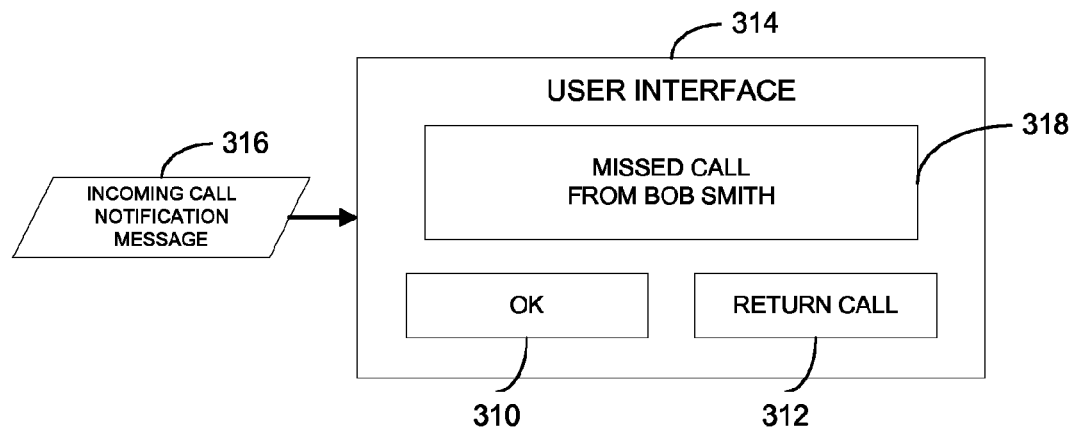
FIG. 3B is a diagram of a second illustrative embodiment of a user interface to display a notification of a missed incoming call from a calling party when a packet precedence feature is activated.
Figure 3C:
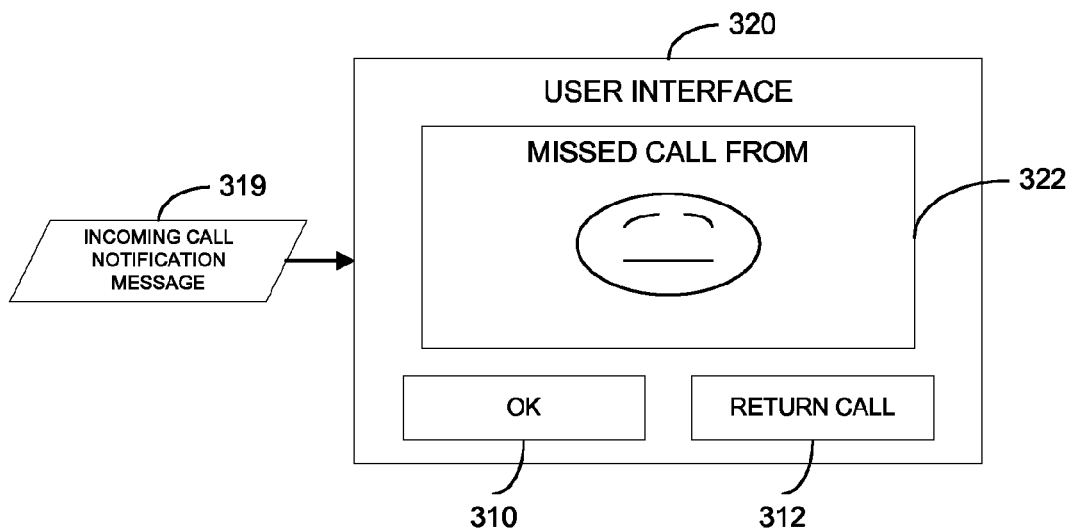
FIG. 3C is a diagram of a third illustrative embodiment of a user interface to display a notification of a missed incoming call from a calling party when a packet precedence feature is activated.

The display device 118 displays a notification of the missed incoming call from the calling party 120 via a user interface (see FIG. 3A, FIG. 3B, and FIG. 3C). By notifying a user of the missed incoming call in substantially real-time, the user may avoid disruption to the PS service without being unaware of the missed incoming call. The user may be able to respond to the missed incoming call at her convenience. Further, the PPOV feature of the present disclosure may provide an improved user experience with respect to the PS service. Accordingly, the display device 118 performs the function of displaying a notification of a missed incoming call from the calling party via a user interface. For example, the display device 118 may include a liquid crystal display (LCD), an organic light emitting diode (OLED), a flat panel display, or a solid state display, among other alternatives.

Figure 2:
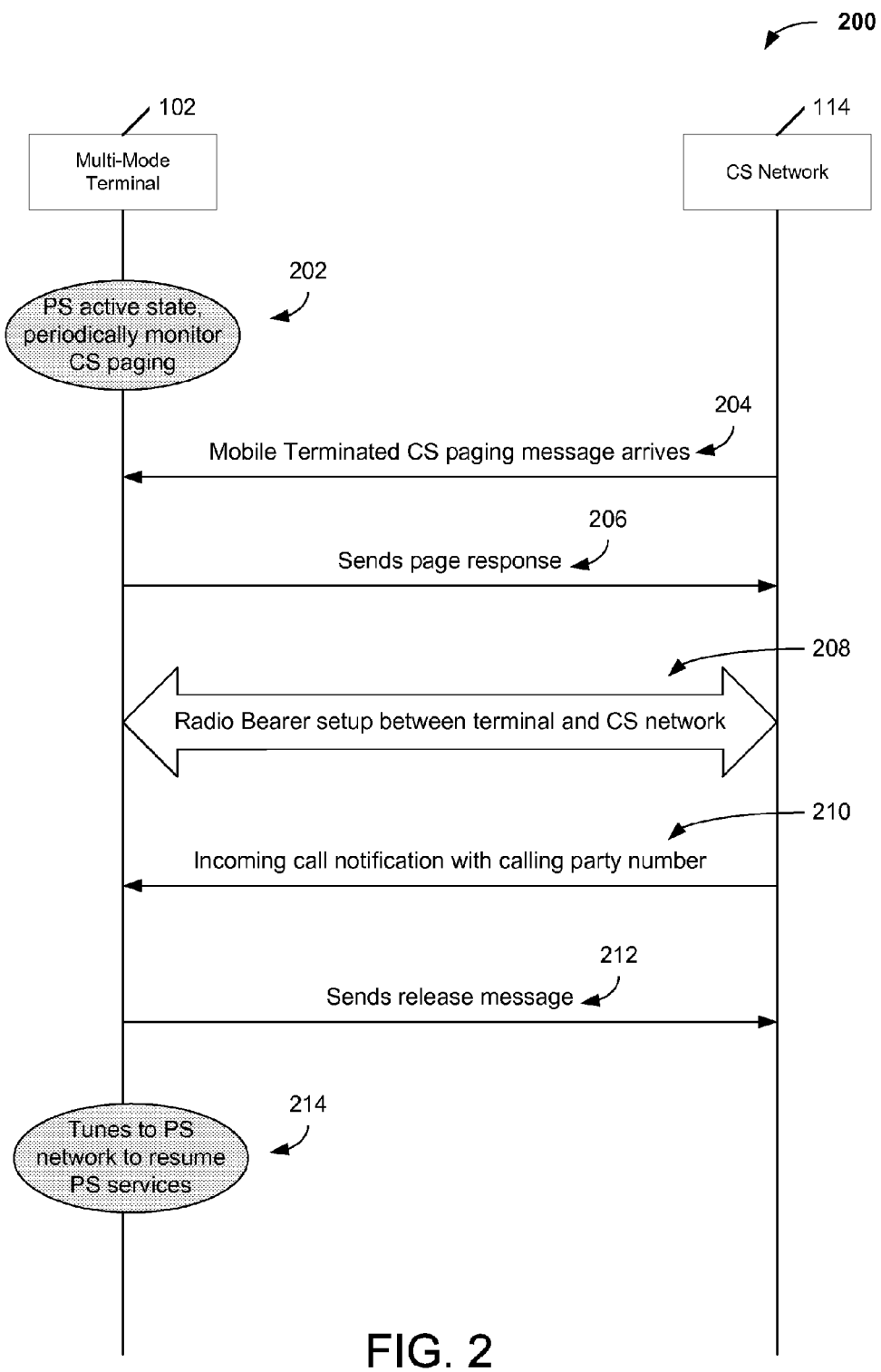
FIG. 2 is a ladder diagram to illustrate a particular embodiment of a sequence of communications associated with a multi-mode communication device that includes call processing logic to activate a packet precedence feature.

Referring to FIG. 2, a particular illustrative embodiment of a sequence of communications associated with a multi-mode communication device that includes call processing logic to activate a packet precedence feature is disclosed and generally designated 200. FIG. 2 illustrates a call processing sequence when a multi-mode terminal is not able to concurrently support both a PS service and a CS service. The call processing sequence of FIG. 2 may prevent termination of a PS service by reducing a delay associated with suspension of the PS service in order to detect an incoming call notification message.

FIG. 2 illustrates communications between a multi-mode terminal (e.g., the multi-mode communication device 102 of FIG. 1) and a CS network (e.g., the CS network 114 of FIG. 1). At 202, a PS service is in an active state at the multi-mode communication device 102, while the multi-mode communication device 102 periodically monitors for CS paging messages from the CS network 114. A mobile terminated CS paging message from the CS network 114 arrives at the multi-mode communication device 102, at 204. In response to the CS paging message, the multi-mode communication device 102 sends a page response to the CS network 114, at 206.

In the embodiment illustrated in FIG. 2, the multi-mode communication device 102 is not able to concurrently support the PS service and the incoming voice call. As such, the PS service is suspended prior to establishing the CS bearer connection with the CS network 114, at 208. After radio bearer setup, the multi-mode communication device 102 receives an incoming call notification from the CS network 114, at 210. In the embodiment illustrated in FIG. 2, the incoming call notification identifies a calling party by calling party number.

Upon receipt of the incoming call notification, the multi-mode communication device 102 sends a release message, at 212. In a particular embodiment, the CS network 114 does not associate the release of the CS bearer connection with a page failure. Further, a calling party may be notified via the CS network 114 that the multi-mode communication device 102 is busy in response to the CS bearer connection being released. At 214, the multi-mode communication device 102 tunes to the PS network (e.g., the PS network 110 of FIG. 1) to resume the PS service. The incoming call notification allows a user to be notified of an incoming call, while a delay associated with suspension of the PS service in order to identify the calling party does not result in a disruption of the PS service (the disruption resulting in a poor user experience).

Referring to FIG. 3A, a first illustrative embodiment of a user interface to display a notification of a missed incoming call from a calling party when a packet precedence feature is activated is disclosed and generally designated 302. The user interface 302 of FIG. 3A provides a user with a calling party number associated with a missed incoming call in substantially real-time without termination of an active PS service.

The user interface 302 of FIG. 3A is generated in response to an incoming call notification message 304 received at a multi-mode communication device (e.g., the multi-mode communication device 102 of FIG. 1). The incoming call notification message 304 may identify a calling party by a calling party number 306. A notification 308 displayed via the user interface 302 may include the calling party number 306 and an indication of a missed call. In the embodiment illustrated, the user may acknowledge the notification 308 or respond to the call via one or more selectable indicators (e.g., buttons or soft keys). For example, an OK button 310 may allow the user to acknowledge the missed call, while a return call button 312 may allow the user to automatically dial the calling party number 306.

Referring to FIG. 3B, a second illustrative embodiment of a user interface to display a notification of a missed incoming call from a calling party when a packet precedence feature is activated is disclosed and generally designated 314. The user interface 314 of FIG. 3B provides a user with a name of a calling party associated with a missed incoming call in substantially real-time without termination of an active PS service.

The user interface 314 of FIG. 3B is generated in response to an incoming call notification message 316 received at a multi-mode communication device (e.g., the multi-mode communication device 102 of FIG. 1). A notification 318 displayed via the user interface 314 may include a name of the calling party and an indication of a missed call. In the embodiment illustrated, the user may acknowledge the notification 318 or respond to the call via one or more selectable indicators. For example, an OK button 310 may allow the user to acknowledge the missed call, while a return call button 312 may allow the user to automatically return the missed call. In the embodiment illustrated in FIG. 3B, the multi-mode communication device includes means for determining a name of the calling party based on the incoming call notification message 316. In one embodiment, the name of the calling party may be included in the incoming call notification message 316. Alternatively, the name of the calling party may be determined based on data stored at the multi-mode communication device (e.g., based on a contact list).

Referring to FIG. 3C, a third illustrative embodiment of a user interface to display a notification of a missed incoming call from a calling party when a packet precedence feature is activated is disclosed and generally designated 320. The user interface 320 of FIG. 3C provides a user with an image of a calling party associated with a missed incoming call in substantially real-time without termination of an active PS service.

The user interface 320 of FIG. 3C is generated in response to an incoming call notification message 319 received at a multi-mode communication device (e.g., the multi-mode communication device 102 of FIG. 1). A notification 322 displayed via the user interface 320 may include an image associated with the calling party and an indication of a missed call. In the embodiment illustrated, the user may acknowledge the notification 322 or respond to the call via one or more selectable indicators. For example, an OK button 310 may allow the user to acknowledge the missed call, while a return call button 312 may allow the user to automatically return the missed call. In the embodiment illustrated in FIG. 3C, the multi-mode communication device includes means for locating an image associated with the calling party based on the incoming call notification message 319. In one embodiment, the image associated with the calling party may be determined based on data stored at the multi-mode communication device (e.g., based on a contact list that associates an image with a calling party).

Figure 4:
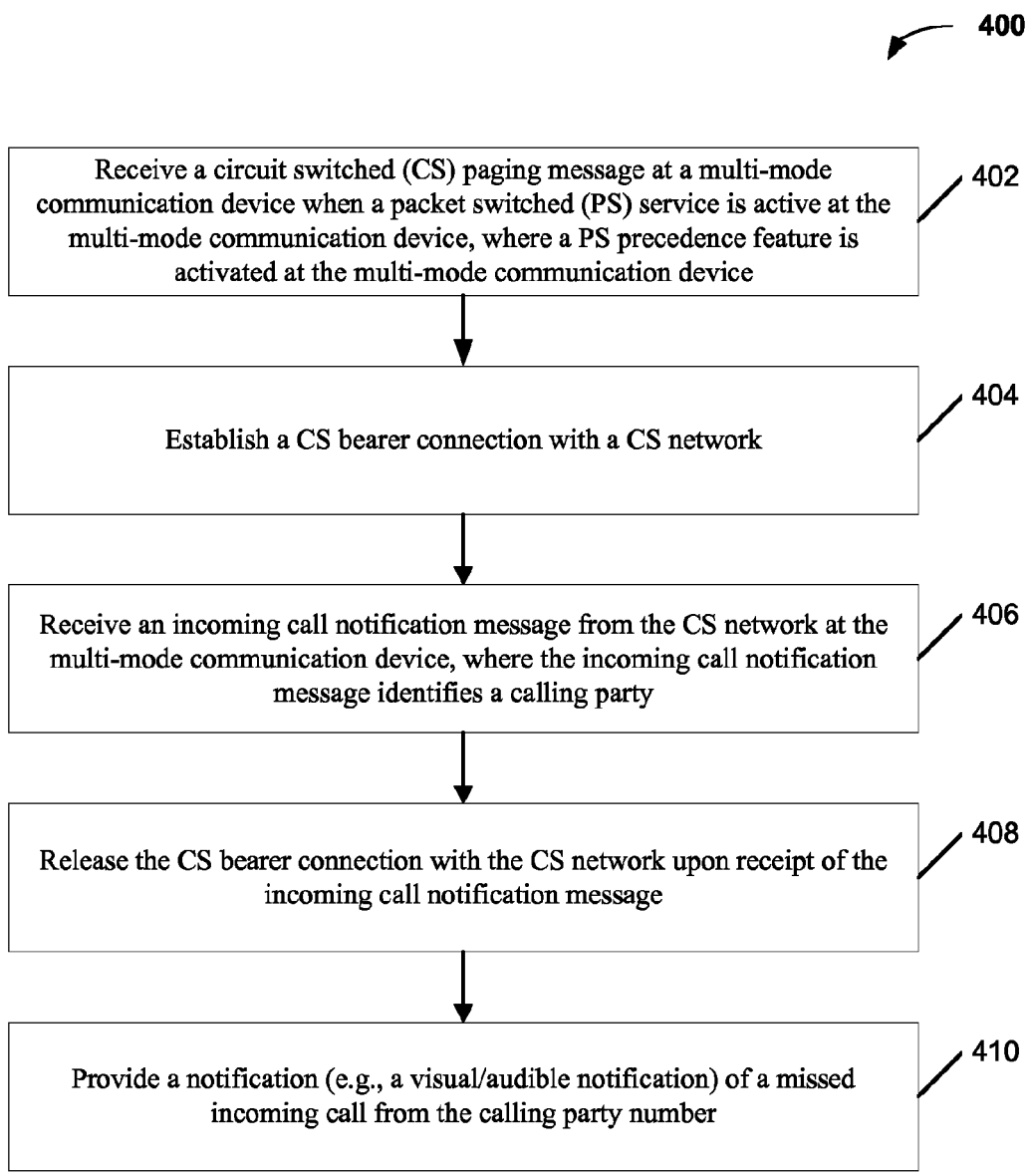
FIG. 4 is a flow chart of a first illustrative embodiment of a method of processing an incoming call at a multi-mode communication device that includes call processing logic to activate a packet precedence feature.

Referring to FIG. 4, a first illustrative embodiment of a method of processing an incoming call at a multi-mode communication device that includes call processing logic to activate a packet precedence feature is disclosed and generally designated 400. In a particular embodiment, the calling processing logic includes instructions (stored at a computer readable tangible medium) that, when executed by a processor, cause the processor to perform the method illustrated in FIG. 4. A packet precedence feature (e.g., a PPOV feature) may provide a user of a multi-mode communication device with the ability to avoid disrupting a high priority packet switched service that may be sensitive to delay in order to receive an incoming call.

The method includes receiving a CS paging message at a multi-mode communication device when a PS service is active at the multi-mode communication device, at 402. At the time the CS paging message is received, a PS precedence feature is activated at the multi-mode communication device that prioritizes PS communications over CS communications. For example, the multi-mode communication device 102 of FIG. 1 may receive a CS paging message from the CS network 114 via the second antenna 106. When the CS paging message is received, a PS service that utilizes the first antenna 104 to communicate with the PS network 110 is active.

The method includes establishing a CS bearer connection with a CS network in response to receiving the CS paging message, at 404. For example, the multi-mode communication device 102 of FIG. 1 may establish a CS bearer connection with the CS network 114 that utilizes the second antenna 106. An incoming call notification message from the CS network is received at the multi-mode communication device, at 406. The incoming call notification message identifies a calling party. The method includes releasing the CS bearer connection with the CS network upon receipt of the incoming call notification message, at 408. For example, the multi-mode communication device 102 of FIG. 1 may receive an incoming call notification message from the CS network 120 that identifies the calling party 120 and may release the CS bearer connection upon receipt of the incoming call notification message.

The method includes displaying a notification of a missed incoming call from the calling party via a user interface of the multi-mode communication device, at 410. For example, the notification may be displayed via the user interface 302 of FIG. 3A, via the user interface 314 of FIG. 3B, or via the user interface 320 of FIG. 3C. As illustrated in FIG. 3A, the displayed notification may identify the calling party by the calling party number 306 that is included in the incoming call notification message 304. As another example, the displayed notification may identify the calling party by name, as illustrated in FIG. 3B. As a further example, the displayed notification may identify the calling party using an image associated with the calling party, as illustrated in FIG. 3C.

Figure 5:
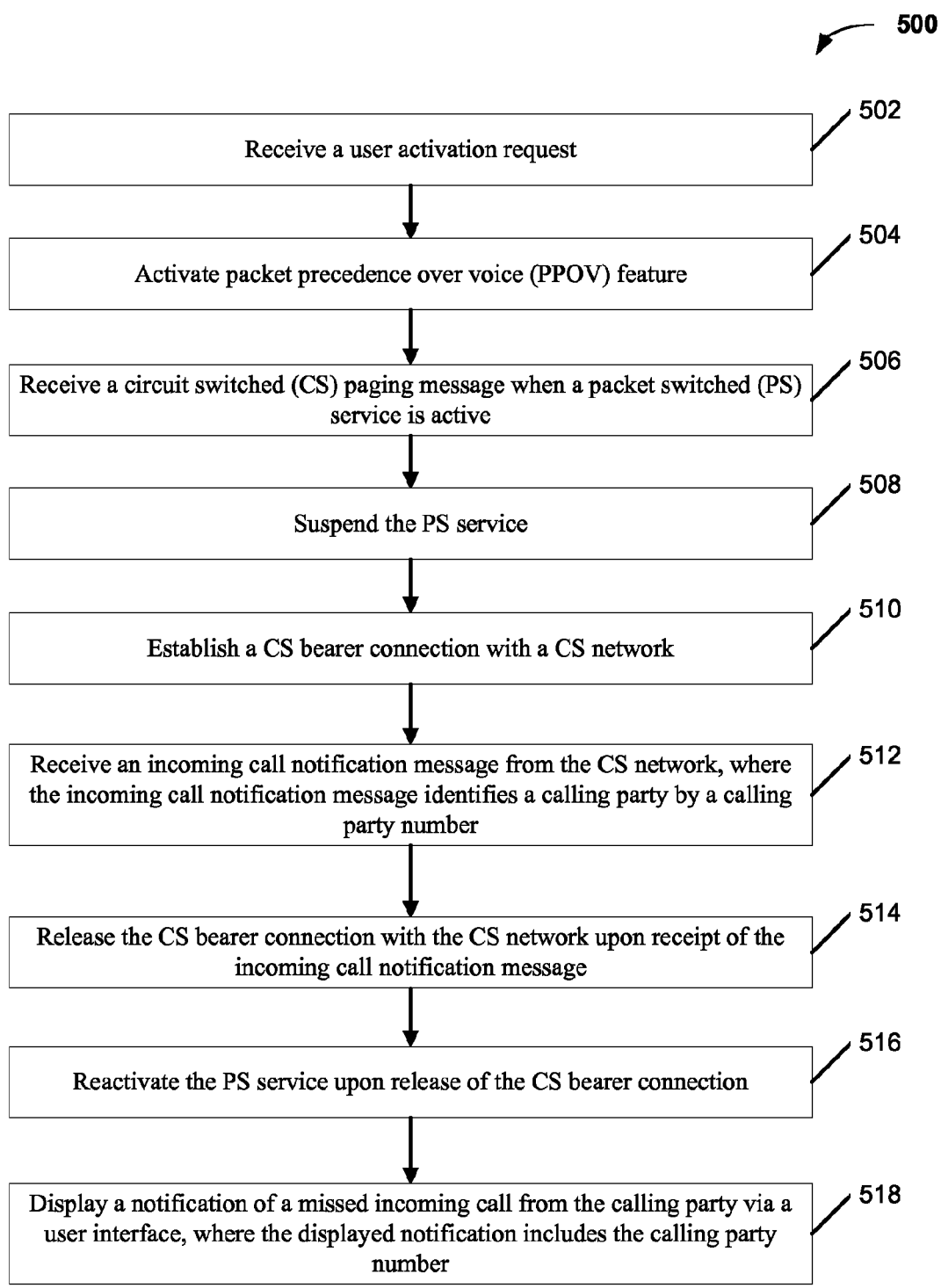
FIG. 5 is a flow chart of a second illustrative embodiment of a method of processing an incoming call at a multi-mode communication device that includes call processing logic to activate a packet precedence feature.

Referring to FIG. 5, a second illustrative embodiment of a method of processing an incoming call at a multi-mode communication device that includes call processing logic to activate a packet precedence feature is disclosed and generally designated 500. In a particular embodiment, the calling processing logic includes instructions (stored at a computer readable tangible medium) that, when executed by a processor, cause the processor to perform the method illustrated in FIG. 5. FIG. 5 illustrates that a PPOV feature may be activated at a multi-mode communication device (e.g., the multi-mode communication device 102 of FIG. 1) in response to a user activation request. For example, the user may activate the PPOV feature for a high priority packet switched service that may be sensitive to delay.

The method includes receiving a user activation request, at 502. For example, the multi-mode communication device 102 of FIG. 1 (e.g., a mobile telephone) may include a keypad, a touch screen, or other input device to receive the user activation request. In the embodiment illustrated in FIG. 5, a PPOV feature that prioritizes packetized data communications with the PS network over voice communications with the CS network is activated, at 504. In other embodiments, the user activation request may be associated with a packet preference feature that prioritizes packetized data communications over circuit switched services other than voice communications.

The method includes receiving a CS paging message when a PS service is active, at 506. In the embodiment illustrated in FIG. 5, the active PS service is suspended, at 508, prior to establishing a CS bearer connection with the CS network, at 510. In alternative embodiments, the active PS service may not be interrupted prior to establishing the CS bearer connection with the CS network. For example, the multi-mode communication device may support concurrent packet switched and circuit switched services. In this case, there is no interruption of the active PS service to allow the multi-mode communication device to communicate with the CS network.

An incoming call notification message that identifies a calling party is received from the CS network, at 512. In the embodiment illustrated in FIG. 5, the incoming call notification message identifies the calling party by a calling party number. For example, the incoming call notification message may be the incoming call notification message 304 of FIG. 3A that includes the calling party number 306. In this case, the method includes releasing the CS bearer connection with the CS network upon receipt of the incoming call notification message, at 514. The PS service is reactivated upon release of the CS bearer connection, at 516.

The method includes displaying a notification of a missed incoming call from the calling party via a user interface of the multi-mode communication device, at 518. In the embodiment illustrated in FIG. 5, the displayed notification includes the calling party number. For example, the user interface 302 of FIG. 3A may display a notification 308 of a missed call from the calling party number.

Thus, in the embodiment illustrated in FIG. 5, the PS service is temporarily suspended to allow for establishing a CS bearer connection, receiving an incoming call notification message, and releasing the bearer connection. As such, the PPOV feature may prevent disruption of a high priority packet switched service that may be sensitive to delay.

Figure 6:
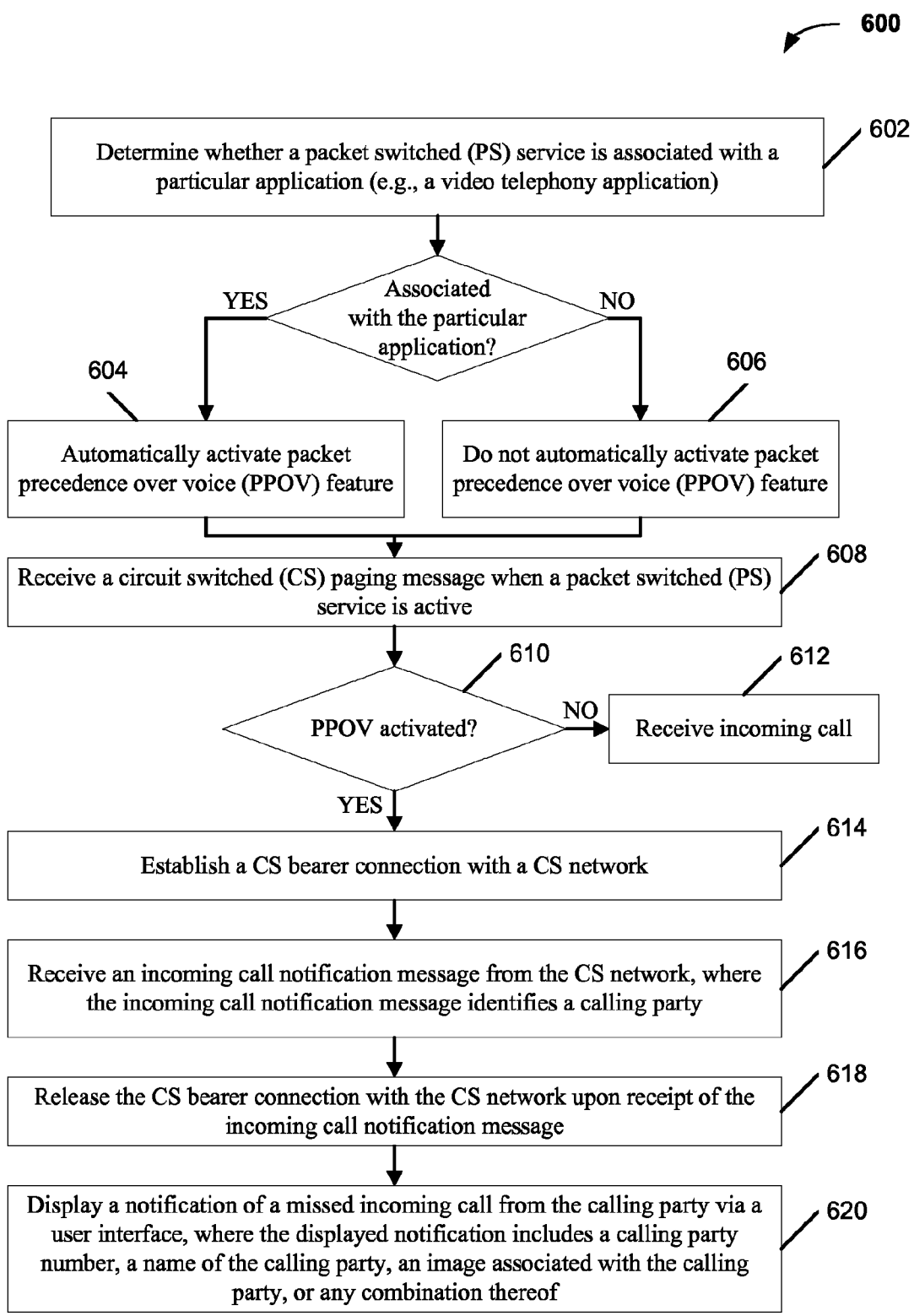
FIG. 6 is a flow chart of a third illustrative embodiment of a method of processing an incoming call at a multi-mode communication device that includes call processing logic to activate a packet precedence feature.

Referring to FIG. 6, a third illustrative embodiment of a method of processing an incoming call at a multi-mode communication device that includes call processing logic to activate a packet precedence feature is disclosed and generally designated 600. In a particular embodiment, the calling processing logic includes instructions (stored at a computer readable tangible medium) that, when executed by a processor, cause the processor to perform the method illustrated in FIG. 6. FIG. 6 illustrates that a PPOV feature may be automatically activated when a PS service is associated with a particular application.

The method includes determining whether a PS service is associated with a particular application (e.g., a video telephony application), at 602. In the embodiment illustrated in FIG. 6, the determination is made prior to receiving a CS paging message. Alternatively, the determination of whether the PS service is associated with the particular application may be performed substantially upon receipt of the CS paging message. When the PS service is associated with the particular application, the method includes automatically activating a PPOV feature, at 604. When the PS service is not associated with the particular application, the PPOV feature is not automatically activated, at 606. As explained above with respect to FIG. 5, the PPOV feature may be activated at any time in response to a user activation request (as shown at 502).

The method includes receiving a CS paging message when a PS service is active, at 608. In response, the method includes determining whether the PPOV feature is activated, at 610. When the PPOV feature is not activated (either automatically or in response to a user activation request), the method includes receiving an incoming call, at 612. When the PPOV feature is activated, a CS bearer connection with the CS network is established, at 614. An incoming call notification message that identifies a calling party is received from the CS network, at 616. Upon receipt of the incoming call notification message, the CS bearer connection is released, at 618.

In an alternative embodiment, the method includes determining whether the calling party is a particular calling party (e.g., a high priority calling party) upon receipt of the incoming calling notification message. When the calling party is a high priority calling party, the method may include deactivating the PPOV feature in order to receive an incoming call. In this case, the CS bearer connection is not released upon receipt of the incoming call notification message. Thus, a user may configure the PPOV feature to be automatically deactivated based on the identity of the calling party, other factors, or any combination thereof. For example, a priority level of a particular PS service may vary based on the identity of the calling party. Further, different PS services may have different priority levels for different calling parties. To illustrate, a video telephony application may be disrupted for one tier of high priority calling parties (e.g., family members) while the PPOV feature may remain activated for another tier of high priority calling parties (e.g., work colleagues). Similarly, a lower priority PS service may be disrupted for multiple tiers of high priority calling parties (e.g., both family members and work colleagues), while the PPOV feature may remain activated for calling parties that are not designated as high priority calling parties. Further, other factors such as whether a calling party number is a long distance number or a local number may be used to determine whether the PPOV feature remains activated.

The method includes displaying a notification of a missed incoming call from the calling party via a user interface, at 620. For example, the displayed notification may include a calling party number (as illustrated in FIG. 3A), a name of the calling party (as illustrated in FIG. 3B), an image associated with the calling party (as illustrated in FIG. 3C), or any combination thereof. The incoming call notification message may include the name or other identifier of the calling party. Alternatively, the name of the calling party may be retrieved from the multi-mode communication device based on the calling party number or based on another calling party identifier. Similarly, an image of the calling party may be retrieved from the multi-mode communication device based on the calling party number or based on other information associated with the calling party.

Thus, FIG. 6 illustrates that the PPOV feature may be automatically activated for PS services associated with certain applications (e.g., a high priority packet switched service that may be sensitive to delay) in order to prevent disruption of the PS service. For example, upon initiation of a video telephony service at the multi-mode communication device, the PPOV feature may be automatically activated in order to prevent disruption of the video telephony service as a result of an incoming voice call. In one embodiment, when the PS service is no longer active, the PPOV feature may be deactivated (either manually or automatically).

Figure 7:
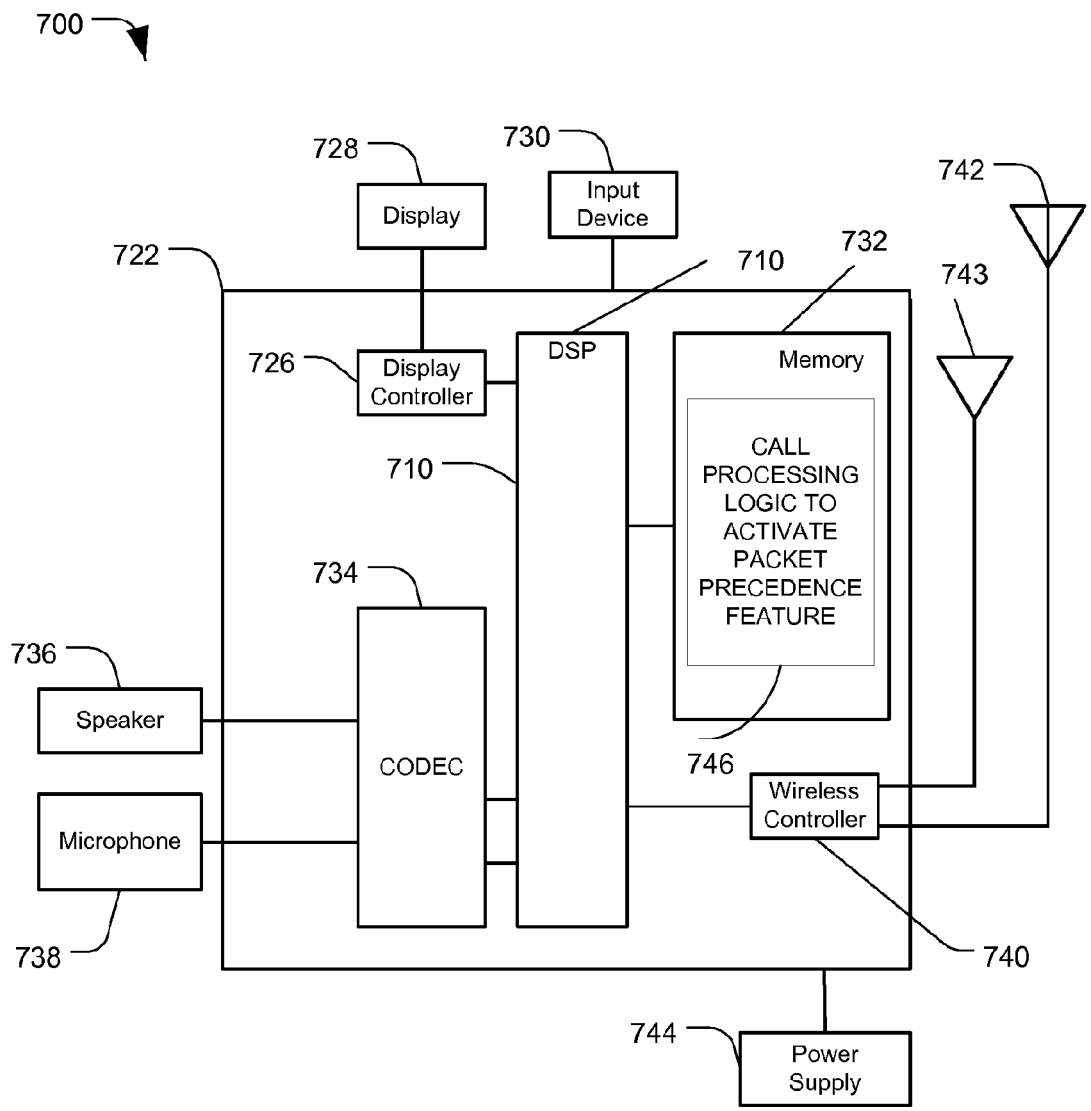
FIG. 7 is a block diagram of multi-mode communication device including call processing logic to activate a packet precedence feature.

Referring to FIG. 7, a block diagram of a particular illustrative embodiment of a multi-mode communication device including call processing logic to activate a packet precedence feature is depicted and generally designated 700. In one embodiment, the multi-mode communication device 700 of FIG. 7 includes the multi-mode communication device 102 of FIG. 1 or FIG. 2. Further, the methods described in FIGS. 4-6 may be performed at the multi-mode communication device 700 of FIG. 7. The multi-mode communication device 700 includes a processor, such as a digital signal processor (DSP) 710, coupled to a memory 732. The memory 732 may include call processing logic 746 to activate a packet precedence feature (e.g., a PPOV feature). FIG. 7 also shows a display controller 726 that is coupled to the digital signal processor 710 and to a display 728. The display 728 may be used to display a notification of a missed incoming call from a calling party via a user interface, as described in FIGS. 1-6. A coder/decoder (CODEC) 734 can also be coupled to the digital signal processor 710. A speaker 736 and a microphone 738 can be coupled to the CODEC 734.

FIG. 7 also indicates that a wireless controller 740 can be coupled to the digital signal processor 710 and to a plurality of wireless antennas. For example, in the embodiment illustrated in FIG. 7, the multi-mode communication device 700 includes a first antenna 742 and a second antenna 743. Alternatively, the multi-mode communication device 700 may include more than two antennas. The first antenna 742 may correspond to the first antenna 104 of FIG. 1 (i.e., to communicate with the PS network 110), and the second antenna 743 may correspond to the second antenna 106 of FIG. 1 (i.e., to communicate with the CS network 114).

In a particular embodiment, the DSP 710, the display controller 726, the memory 732, the CODEC 734, and the wireless controller 740 are included in a system-in-package or system-on-chip device 722. In a particular embodiment, an input device 730 and a power supply 744 are coupled to the system-on-chip device 722. Moreover, in a particular embodiment, as illustrated in FIG. 7, the display 728, the input device 730, the speaker 736, the microphone 738, the wireless antennas 742 and 743, and the power supply 744 are external to the system-on-chip device 722. However, each of the display 728, the input device 730, the speaker 736, the microphone 738, the wireless antennas 742 and 743, and the power supply 744 can be coupled to a component of the system-on-chip device 722, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method for prioritizing a packet switched (PS) service over a circuit switched (CS) service, the method comprising:
    receiving a circuit switched (CS) paging message at a multi-mode communication device when the PS service is active at the multi-mode communication device, wherein a PS precedence feature is activated at the multi-mode communication device that prioritizes PS communications over CS communications;
    in response to receiving the CS paging message, establishing a CS bearer connection with a CS network;
    receiving an incoming call notification message from the CS network at the multi-mode communication device, wherein the incoming call notification message comprises information identifying a calling party, wherein the information identifying the calling party comprises the name, telephone number, or another identifier of the calling party;
    upon receipt of the incoming call notification message, releasing the CS bearer connection with the CS network; and
    displaying a notification of a missed incoming call from the calling party via a user interface of the multi-mode communication device based on the information identifying the calling party provided in the incoming call notification message.

2. The method of claim 1, wherein the CS paging message is associated with a voice call, and wherein the PS precedence feature includes a packet precedence over voice (PPOV) feature.

3. The method of claim 1, wherein the PS service is suspended prior to establishing the CS bearer connection with the CS network, and wherein the PS service is reactivated upon release of the CS bearer connection.

4. The method of claim 3, wherein a delay associated with suspension of the PS service in order to detect the incoming call notification message does not result in termination of the PS service.

5. The method of claim 1, wherein the PS service that is active at the multi-mode communication device is not interrupted when the multi-mode communication device supports a concurrent CS service.

6. The method of claim 1, wherein a first mode of the multi-mode communication device includes an Evolution-Data Optimized (EVDO) mode that provides PS services, and wherein a second mode of the multi-mode communication device includes a Global System for Mobile Communications (GSM) mode that provides CS services.

7. The method of claim 1, wherein the incoming call notification message identifies the calling party by a calling party number, and wherein the displayed notification includes the calling party number.

8. The method of claim 1, wherein a calling party is notified via the CS network that the multi-mode communication device is busy in response to the CS bearer connection being released.

9. The method of claim 8, wherein the CS network does not associate the release of the CS bearer connection with a page failure.

10. An apparatus configured to prioritize a packet switched (PS) service over a circuit switched (CS) service, the apparatus comprising:
    a first antenna to communicate with a packet switched (PS) network;
    a second antenna to communicate with a circuit switched (CS) network;
    a display device; and
    call processing logic to:
        activate a packet precedence over voice (PPOV) feature that prioritizes packetized data communications with the PS network over voice communications with the CS network;
        receive a CS paging message via the second antenna when the PS service that utilizes the first antenna to communicate with the PS network is active;
        establish a CS bearer connection with the CS network via the second antenna in response to receiving the CS paging message;
        receive an incoming call notification message from the CS network via the second antenna, wherein the incoming call notification message comprises information identifying a calling party, wherein the information identifying the calling party comprises the name, telephone number, or another identifier of the calling party;
        release the CS bearer connection with the CS network upon receipt of the incoming call notification message; and
        display a notification of a missed incoming call from the calling party via a user interface displayed at the display device based on the information identifying the calling party provided in the incoming call notification message.

11. The apparatus of claim 10, wherein the call processing logic suspends the PS service prior to establishing the CS bearer connection with the CS network and reactivates the PS service upon release of the CS bearer connection.

12. The apparatus of claim 10, wherein the call processing logic does not interrupt the PS service prior to establishing the CS bearer connection with the CS network.

13. An apparatus configured to prioritize a packet switched (PS) service over a circuit switched (CS) service, the apparatus comprising:
    means for activating a packet precedence over voice (PPOV) feature that prioritizes packetized data communications with a packet switched (PS) network over voice communications with a circuit switched (CS) network;
    means for receiving a CS paging message when the PS service is active;
    means for establishing a CS bearer connection with the CS network in response to receiving the CS paging message;
    means for receiving an incoming call notification message from the CS network, wherein the incoming call notification message comprises information identifying a calling party, wherein the information identifying the calling party comprises the name, telephone number, or another identifier of the calling party;
    means for releasing the CS bearer connection with the CS network upon receipt of the incoming call notification message; and
    means for displaying a notification of a missed incoming call from the calling party via a user interface based on the information identifying the calling party provided in the incoming call notification message.

14. The apparatus of claim 13, further comprising:
    means for suspending the PS service prior to establishing the CS bearer connection with the CS network; and means for reactivating the PS service upon release of the CS bearer connection.

15. The apparatus of claim 13, further comprising means for receiving a user activation request, wherein the PPOV feature is activated in response to the user activation request.

16. The apparatus of claim 13, further comprising means for determining a name of the calling party based on the incoming call notification message, wherein the displayed notification includes the name of the calling party.

17. The apparatus of claim 13, further comprising means for locating an image associated with the calling party based on the incoming call notification message, wherein the displayed notification includes the image associated with the calling party.

18. A computer readable tangible medium comprising instructions that prioritize a packet switched (PS) service over a circuit switched (CS) service that, when executed by a processor, cause the processor to:
   receive a circuit switched (CS) paging message when the PS service is active;
   determine whether a packet precedence over voice (PPOV) feature is activated, wherein the PPOV feature prioritizes packetized data communications with a PS network over voice communications with a CS network; and
   upon determining that the PPOV feature is activated, establish a CS bearer connection with a CS network;
   receive an incoming call notification message from the CS network, wherein the incoming call notification message comprises information identifying a calling party, wherein the information identifying the calling party comprises the name, telephone number, or another identifier of the calling party;
   release the CS bearer connection with the CS network upon receipt of the incoming call notification message; and
   display a notification of a missed incoming call from the calling party via a user interface based on the information identifying the calling party provided in the incoming call notification message.

19. The computer readable tangible medium of claim 18, further comprising instructions that, when executed by the processor, cause the processor to:
   suspend the PS service prior to establishing the CS bearer connection with the CS network; and
   reactivate the PS service upon release of the CS bearer connection.

20. The computer readable tangible medium of claim 18, further comprising instructions that, when executed by the processor, cause the processor to determine whether the PS service is associated with a particular application.

21. The computer readable tangible medium of claim 20, further comprising instructions that, when executed by the processor, cause the processor to automatically activate the PPOV feature when the PS service is associated with the particular application.

22. The computer readable tangible medium of claim 21, wherein the particular application includes a video telephony application.

23. The computer readable tangible medium of claim 20, further comprising instructions that, when executed by the processor, cause the processor to:
   determine whether the calling party is a particular calling party upon receipt of the incoming call notification message;
   automatically deactivate the PPOV feature when the calling party is the particular calling party; and
   receive an incoming call from the particular calling party without releasing the CS bearer connection with the CS network upon receipt of the incoming call notification message.

* * * * *